Patented Apr. 23, 1940

2,198,381

UNITED STATES PATENT OFFICE 2,198,381

WATER SOFTENING PROCESS

Carleton Ellis, Montclair, N. J., assignor to Ellis-Foster Company, a corporation of New Jersey No Drawing. Application June 2, 1937,
Serial No. 145,986

5 Claims. (Cl. 210—24)

This invention relates to the softening of water by treating said water with a bed of non-color-throwing organic filter material which has marked base-exchange properties, and which is immune to growth of molds. Such filter material can be produced by treatment of organic material including tannins, tannin-containing wood extracts (also including sulphite cellulose waste liquor solids made from woods containing tannin), with "acid sludge" produced as a by-product in the refining of petroleum oils, which sludge contains sulphuric acid, sulphurous acid, sulphonic acids, and organic materials taken up from the oil being treated. During said treatment it is advisable that the temperature be caused to rise to at least about 80° or to a higher temperature such as 150° C. Some heat will be liberated by the chemical action.

It is a primary object of the invention to provide, for water-softening, filter beds which possess the quality of base-exchange to a marked degree.

It is also an object of the invention to produce filter beds of organic base-exchange materials which will not support the growth of those saprophytic species of fungi known as molds, e. gi., Penicillium or Aspergillus.

It is a further object to obtain a filter bed capable of softening water which will regenerate rapidly and which will require a minimum of water to wash out excess regenerant and ions for which the regenerant has base-exchanged.

Another object is the preparation of an organic base-exchange filter bed which is not color throwing, that is, one which will not discolor water passing through it in the normal water-softening cycles.

Adams and Holmes have described (British Patent 450,308) a water-softening synthetic resin which is obtained by condensing polyhydric phenols with formaldehyde. If such material is stored for a few days in a moist condition, frequently it soon becomes covered with a characteristic greenish-gray moldy growth. Further, if the material is allowed to stand with a supernatant layer of water, the liquid sometimes becomes moldy on the surface and throughout the liquid and the lower layer of resin also becomes moldy. At the same time, the water layer may become quite highly colored because of an orange-brown substance that apparently leaches out of the resin.

These changes are unsatisfactory because a colored effluent would be generally undesired and unsatisfactory. This property of coloring the water is termed in this art, "color-throwing," i. e., the purifying agent throws off color into the water. Also, the growth of fungus in the base-exchange medium (which might be brought about by allowing the apparatus to stand idle or indeed might occur in certain parts of the bed even while normal operation was taking place) would be liable to clog the filter bed, seriously lower the capacity of a water-softening unit, and also attack the water-softening medium itself. Furthermore, it is obvious that such materials woul be of little value in connection with waters containing pathological organisms.

The materials of the present invention which are the insoluble reaction products of petroleum sludge and wood extracts of the kind herein set forth, are not subject to these disadvantages. No trace of mold has ever been observed by me to have grown on any of these sludge-insolubilized wood-extracts. Further, if properly made, they will not give any color to water passing through a bed of the material, by a leaching occuring during the step of passing the water through the mass. If a tendency toward this condition is noticed, it may be overcome by carrying out the insolubilization to a greater degree as for example by allowing the acid (e. g. acid sludge) to react at higher temperature or for a longer time, on the wood extract.

In the operation of zeolite water-softening plants, the wash water requirement is an item of considerable expense. This water is that which is required immediately after the regeneration step in order to wash out excess regenerating fluid and also those ions causing hardness which are now in solution by virtue of the base-exchange reaction with the regenerant. This water is of course wasted, and the cost has been shown by J. H. Walker and L. F. Collins (Industrial and Engineering Chemistry, 21, 1020 (1929)) in the case of the installation at the Beacon Street Plant of the Detroit Edison Co. to represent 10.2% of the operating costs. A. S. Behrman (Journal of the American Water Works Association, 26, 618–28 (1934)) estimates the normal wash-water requirements of a synthetic zeolite to be 5 to 10 per cent of the total volume of water softened, and that of a greensand zeolite to be 20 to 25 per cent.

I have found by experiment that the wash water requirement for the materials herein described is less than 5 per cent of the total volume of water treated.

In preparing these materials I may take, for example, chestnut extract, quebracho extract, cutch, hemlock extract, or the raw plant products om which they are derived, waste cellulose-sulphite liquor or other tannin-containing wood extract, and add it with stirring to from 2 to 10 times its weight of acid sludge from petroleum refining. Depending on the specific materials used, the temperature, concentrations, and amount of moisture present, a reaction takes place which may liberate a sufficient amount of heat to cause a sharp rise in temperature. Agitation and a sufficiently large vessel to hold any foam produced are recommended. I prefer to keep the temperature within the limits of 60° to 100° C. and a desirable mean temperature is 70°-90° C. The temperature should not rise to over 150° C., in any case, or the base-exchange properties of the material will be substantially reduced. Any of the known methods such as artificial heating or cooling, dilution with water or other appropriate solvent, or choice of reagents or raw materials may be utilized to this end. A desirable type of sludge is one obtained from white oil refining. A typical sample of this material is a black, viscous liquid having an odor of sulphur dioxide and a specific gravity of about 1.4.

I prefer to so adjust the temperature, concentrations, and time of reaction that the product is substantially wholly insoluble in water. If the temperature is kept too low, the product remains water-soluble; if the temperature is too high, the base-exchange capacity is reduced. At 80°-90° C. the reaction is usually sufficiently complete in 10 to 30 minutes. When the reaction is finished I may allow the material to cool gradually to room temperature or may arrest the reaction by cooling, and conveniently by pouring the charge into a relatively large volume of water, this also serving to partially wash the product free of any excess of reagents. It is not absolutely necessary to wash at this point, as the washing step may be carried out after drying. If placed in water, however, the solids are separated by a suitable means such as filtration or decantation, and further washed if desired. Although the material may be used while still wet but washed substantially free of excess reactants, I prefer to dry it, as this serves to improve the granule characteristics such as porosity and crushing strength. The freshly precipitated product is ordinarily of a variety of particle sizes. It may be crushed or ground and classified by screening, and this may take place before washing so that the latter process is facilitated; but screening may be accomplished more successfully after drying. Also the cake may be extruded, dried and comminuted to the desired filtration-granule size.

The yield of finished material is remarkably high, being about 60% of total input by weight when 4 parts of sludge (of which as much as 30% may be water) are used with 1 part of the solids of the waste liquor left from cooking hemlock wood in the usual sulphite cooking liquor. The petroleum sludge contains sulphonic and sulphurous acids, as well as other substances including organic matter. That this combination reacts with tannin-containing extracts to produce a high yield of water-insoluble product is unexpected, since sulphonic acids are water sensitive, and addition of sulphite is a common method of rendering tannins more soluble, as may be noted in the processes of sulphiting quebracho extract or the production of sulphite pulp from wood. A distinct advantage of the products of the present invention is their cheapness, since sludge is generally a waste product.

A suitable method of use of the water softening material is to place the classified material in an apparatus of the type commonly employed in zeolite water softening, to form a filter bed which will permit the water to run through by gravity or under pressure. The water to be treated is then led through the apparatus, and the base-exchange material removes the undesirable ions. When the bed is exhausted it may be regenerated by running dilute acid, say 5% sulphuric, or sodium chloride brine through it. ("Exhausted" as here used, as in the prior art, means that the base-exchange material will not efficiently remove further amounts of the undesirable ions from the water.) It may be mentioned at this point that a desirable feature of the present products is that they may be regenerated with acid solutions without disintegration, whereas a similar treatment of ordinary zeolites would disintegrate the same.

The following examples are given by way of illustration and should not be construed to limit the invention as to scope or proportions.

*Example 1.*—One hundred parts by weight of dried hemlock sulphite liquor and 400 parts of white-oil sludge were thoroughly mixed and heated to 80° C. for 10 minutes. The reaction mixture was allowed to stand while spontaneously cooling for 30 minutes, when it was diluted with a large volume of water, filtered and dried at 110° C.

A sample which had been screened through 20 over 40 mesh was placed in a glass tube 2 cm. in diameter to form a column 10 cm. high. This was tested with water containing 385 ppm. hardness (as calcium carbonate) and it softened an average of 2100 cc. of water using 300 cc. of 10% sodium chloride for regenerating. After each regeneration cycle, an average of 50 cc. of water were required to be run through the column before the effluent was soft. This is about 2.3 per cent of the volume of water softened.

*Example 2.*—One hundred parts by weight of chestnut extract and 300 parts white-oil sludge were mixed and heated slowly to 150° C. The material gradually became more viscous and finally resembled a granular solid. It was washed in a large volume of water and dried.

A sample ground to pass through 20 on 40 mesh screens was placed in a glass tube 2 cm. in diameter to form a filter bed 10 cm. high. This was tested by passing water of 478 ppm. hardness downward through the bed. An average of 750 cc. were softened using 200 cc. of 10% sodium chloride brine.

The material was allowed to stand in contact with distilled water for 1 hour. No color, taste, or odor was detectable in the supernatant water.

*Example 3.*—One hundred parts by weight of dried, powdered, sulphited quebracho extract were mixed with 500 parts of white-oil sludge. The mixture became warm and sulphur dioxide was evolved. It was heated to 80° C., held at that temperature for 10 minutes, allowed to cool to 60° C., poured into a large volume of water, filtered, and dried at 120° C.

The product was tested as in the preceding examples with a solution of calcium sulphate containing 407 ppm. hardness. A total of 1650 cc. of the water were softened per cycle, using 200 cc. of 10% sodium chloride as regenerant.

It will be noted that in the above examples, the amounts of the acid material are given as 400, 500 and 300, per 100 parts of the tanning extract used. The figures can vary to some extent. Proportions of the order indicated can be included in the expression "several parts by weight (of the acid) to one part by weight of the extract."

*Example 4.*—A solution of calcium bicarbonate containing 342 ppm. hardness (figured as calcium carbonate) and 0.405 mg. bicarbonate ion per cc. was prepared and used to test the product of Example 1 which had been regenerated with 250 cc. of 5% sulphuric acid. The filter softened 1650 cc. of the water. After a second regeneration, 1850 cc. of water containing 406 ppm. hardness and 0.478 mg. bicarbonate ion per cc. were treated. In each case, the bicarbonate ion was destroyed by virtue of the hydrogen ion released from the base-exchange material when the calcium was absorbed.

*Example 5.*—In this example, formaldehyde and a quebracho extract were reacted to form a resin. Results obtained should be compared with those of Example 6.

One hundred parts by weight of a powdered quebracho extract were dissolved in 500 parts of water. The solution was diluted with 500 parts of water and 200 parts of 37% formalin and the mixture was heated to boiling. Sixty parts of concentrated hydrochloric acid were added and the entire mass set to a soft gel which was broken up, washed with water, and dried at 50° C.

After subjecting a sample of the granulated material to three exhaustions with calcium sulphate solution and three regenerations with 10% sodium chloride solution, the sample was drained and placed in a stoppered bottle for one week. At that time, the material was covered with a growth of mold.

Another sample which had been exhausted and regenerated as above was covered with ten times its volume of distilled water and allowed to stand at room conditions. After 24 hours the supernatant liquid was colored a light yellow. After 6 days the layer of liquid immediately above the resin was dark brown colored and the surface of the liquid was moldy. After one month, the entire liquid was dark colored and the mold extended throughout the liquid and on the solid resin.

*Example 6.*—The products made as in Examples 1 and 3 were simultaneously subjected to the same conditions as the samples of Example 5 and no mold growth or water coloration could be observed.

Samples of products of Examples 1, 2 and 3 were placed in 5 times their volume of distilled water. No mold growth occurred. The materials were inoculated with portions of the mold which grew on the quebracho-formaldehyde resin of Example 5. Growth did not continue on these new mediums, and after one week the portions of mold which served as inoculators had dried up and substantially disappeared.

Water softening agents of the type herein set forth, are claimed in my copending cases, Ser. No 119,131, filed Jan. 5, 1937, and Ser. No. 120,143 filed Jan. 11, 1937.

What I claim is:

1. A process of softening water having hardness, which comprises flowing said water in contact with a bed of non-color-throwing organic material which resists growth of mold, and which comprises the base-exchange substance produced by the action on one part by weight of a tannin-containing extract with about 2 to 10 parts of a sulphuric acid of a sufficient concentration to generate heat when brought into contact with said extracts, and insolubilizing the solid reaction product by carrying the temperature to between 60 and 120° C.

2. A process of softening water having hardness, which comprises flowing said water in contact with a bed of non-color-throwing organic material which resists growth of mold, and which comprises a base-exchange material produced by the action of several parts by weight of an acid petroleum sludge on one part by weight of a solid tan extract, in which action the temperature is brought to between 60 and 150° C.

3. A process of softening water having hardness, which comprises flowing said water in contact with a bed of non-color-throwing organic material which resists growth of mold, and which comprises a base-exchange material produced by the action of several parts of acid sludge from petroleum refining on one part of the solids o waste cellulose sulphite liquor, at a temperature between about 50 and 120° C., for about 10 to 3 minutes.

4. A process of softening water having hardness, which comprises flowing said water in contact with a bed of non-color-throwing organi material which resists growth of mold, and which comprises a base-exchange material produced b the action of several parts of acid sludge fror white oil refining on one part of chestnut extract at a temperature of about 80–90° C., for a tim which is a substantial fraction of an hour.

5. A process of softening water having hardness, which comprises flowing said water in contact with a bed of non-color-throwing organi material which resists growth of mold, and whic comprises a base-exchange material produced b the action of several parts of an acid petroleur sludge on one part of a tannin, such reaction c acid on tannin being conducted at about 50 t 120° C., for a time which is a substantial fractio only of an hour.

CARLETON ELLIS.